Jan. 23, 1951  H. L. ROSENTHAL  2,538,914
SELF-FEEDING CORN HUSKING MACHINE
Filed Nov. 19, 1945  2 Sheets-Sheet 1
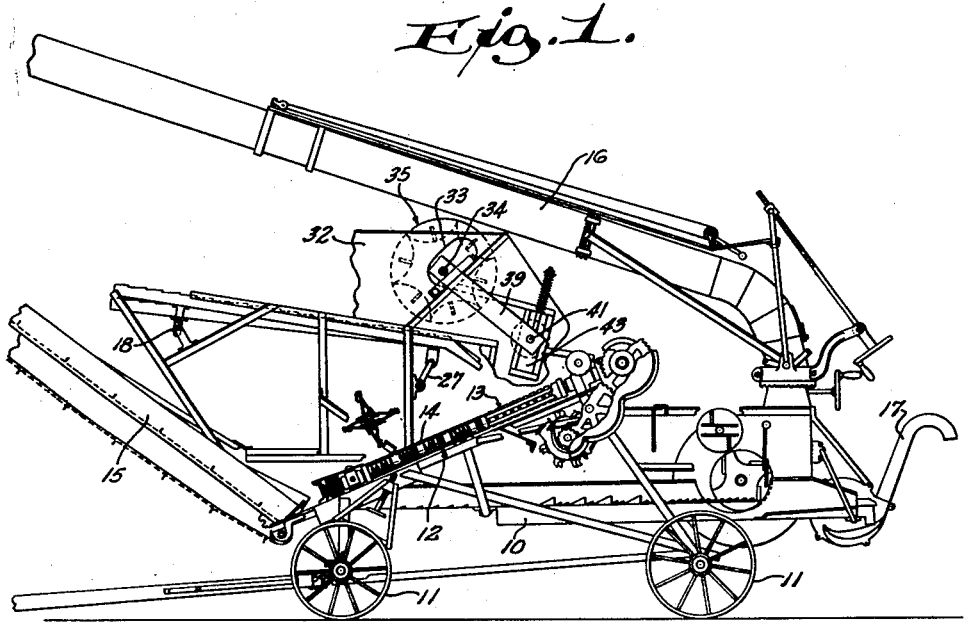
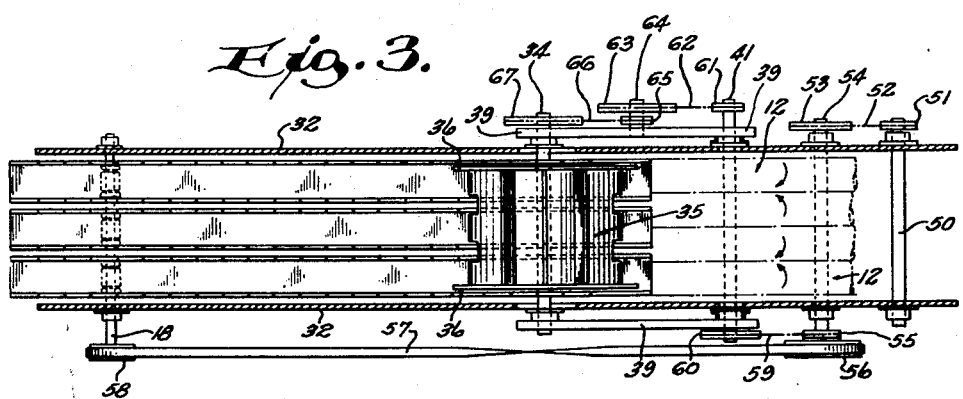
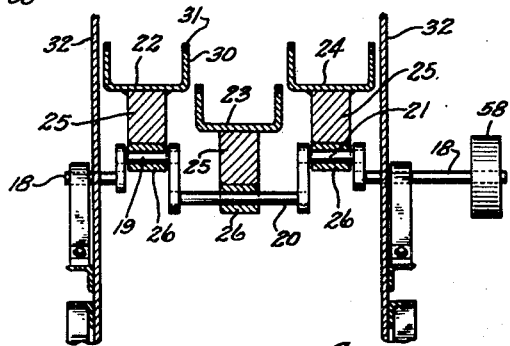
INVENTOR.
Henry L. Rosenthal
BY
Morsell & Morsell
ATTORNEYS

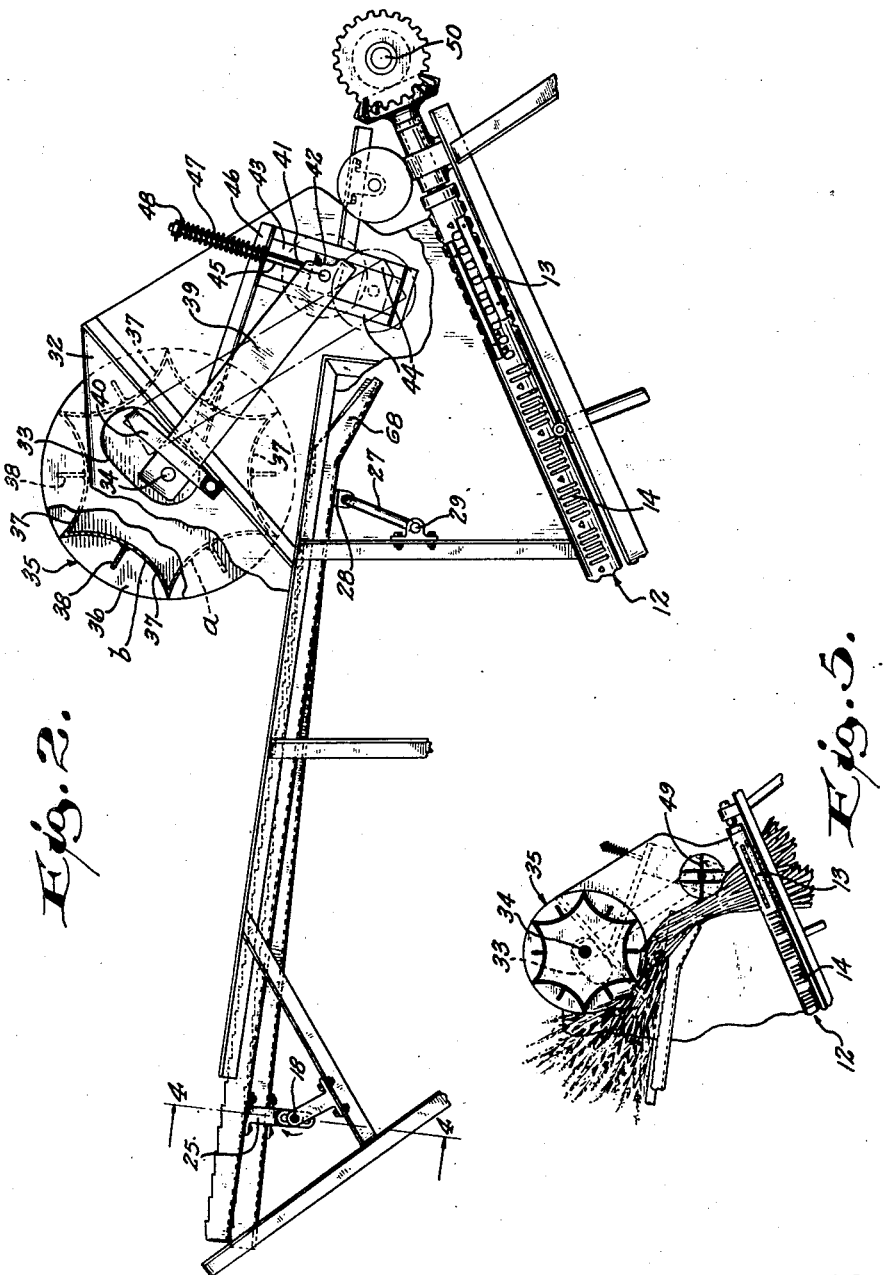

Patented Jan. 23, 1951

2,538,914

UNITED STATES PATENT OFFICE 2,538,914

SELF-FEEDING CORN HUSKING MACHINE

Henry L. Rosenthal, Milwaukee, Wis., assignor to Henry L. Rosenthal, Paul H. Rosenthal, Lawrence E. Rosenthal, and Mabel A. Rosenthal, copartners doing business as Rosenthal Mfg. Co., Milwaukee, Wis.

Application November 19, 1945, Serial No. 629,549

5 Claims. (Cl. 130—33)

This invention relates to improvements in self feeding corn husking machines and is a continuation in part of application Serial No. 536,500, filed May 20, 1944, now abandoned.

In that type of corn husking machine wherein there are combination snapping and husking rollers which extend in a generaly longitudinal direction, the incorporation of a satisfactory type of self feeder has presented difficulties. The reason for this is that the corn stalks as they leave the feeding deck members must be directed downwardly at an angle to their original direction of movement on the feeding decks so that they will properly pass through the snapping portions of the combination husking and snapping rolls. It is also important that subsequent bundles be held back on the feeding decks until the first bundle has been properly directed and has passed a sufficient distance through the snapping portions of the rolls. Unless this problem is taken care of there will be choking of the machine with accompanying inconvenience and loss of time.

In that type of corn husking machine wherein there are separate transversely extending snapping rolls, the problems connected with a self feeder are entirely different because the corn stalks on the feeding decks may be guided directly into the bite of the snapping rollers without any change in the direction of travel.

It is a general object of the present invention to provide a self feeder for a husking machine of the type having combination snapping and husking rollers, wherein the feeding mechanisms so constructed as to cause a proper feed of the stalks to longitudinaly extending snapping portions of combination husking and snapping rolls without causing choking of the machine.

A more specific object of the invention is to provide a construction as above described wherein there are vibratory decks for preliminarily feeding the bundles forwardly at a relatively fast rate of speed, and wherein there is a specially constructed retarding drum so positioned with respect to the decks as to temporarily stop the forward end of a bundle while the forward throw of the decks tends to separate individual stalks in the bundle and cut the bands of twine, the said drum being rotated at a relatively slow rate of speed to progressively feed the bundles therebeneath, and there being a beating roller so arranged with respect to the forward ends of the decks and with respect to the rotating drum as to cause a change in the direction of travel of the corn stalks, a separation of the ends of the stalks and an efficient feeding of said ends into the bite of the snapping portions of the rolls.

A still more specific object of the invention is to provide a construction as above described wherein the bearings for the retarding drum shaft and for the beater roll shaft are mounted for floating movement and interconnected with one another.

A further object of the invention is to provide a self feeding mechanism as above described in which the feeding movement of bundles as far as the retarding drum is performed by the vibrating movement of the decks, and wherein the feeding movement from this point on is accomplished principally by the action of the drum and beater.

With the above and other objects in view, the invention consists of the improved self feeding corn husking machine, and all its parts and combinations, as set forth in the claims, and all equivalents thereof.

In the accompanying drawings, illustrating one complete embodiment of the preferred form of the invention, in which the same reference numerals designate the same parts in all of the views:

Fig. 1 is a side elevational view, partially in diagrammatic form, of a corn husker embodying the improved self feeding mechanism, casing portions being broken away to show the interior mechanism:

Fig. 2 is a fragmentary side elevational view of the self feeding mechanism illustrating its association with the combination snapping and husking rollers, parts being broken away and shown in section;

Fig. 3 is a partially diagrammatic view looking down on the structure of Fig. 2, with the outside casing portions shown in horizontal section and the combination husking and snapping rolls shown by dot and dash lines;

Fig. 4 is a sectional view taken on the line 4—4 of Fig. 2; and

Fig. 5 is a fragmentary vertical longitudinal sectional view showing the action of the retarding drum and beater roll in causing the stalks to "turn the corner" after leaving the decks.

Referring more particularly to the drawings, the corn husker illustrated in Fig. 1 includes a frame 10 supported on wheels 11. The frame supports combination husking and snapping rolls 12, which are now well known in the art and which extend longitudinally of the machine and are inclined downwardly toward their discharge end. Preferably there are two pairs of these rollers as is clear from Fig. 3. The snapping portions are at the upper end and are designated by the numeral 13. The husking portions are designated by the numeral 14. Stalks which are delivered to the snapping portions 13 pass through said portions and the ears are snapped off. The ears travel downwardly along the husking portions 14 where the husking operation is performed. The ears are then delivered by an endless elevator belt 15 to a suitable receptacle. After the stalks pass through the snapping portions 13 they are cut up by a suitable shredding apparatus, which is well known in the art, and the shredded fodder is blown through a conduit 16 and into a wagon or other receptacle. Shelled corn which is separated from the fodder is discharged from a spout 17. The above described mechanism is at the present time well known in the art but has been described so that the novel features of the present invention will be more clearly understood.

Journalled transversely of the frame at the bundle receiving end thereof, is a crank shaft 18 having a plurality of cranks 19, 20 and 21 thereon. In the illustrated embodiment of the invention there are three cranks for supporting and actuating three vibratory feeding decks 22, 23 and 24. It is, however, possible that more than three decks may be employed. The decks have extensions 25 projecting downwardly therefrom and each extension has a bearing portion 26 at its lower end through which the cranks extend. Near its inner end each deck is supported on the upper end of a swinging arm 27, the upper end of the arm being suitably pivoted to a bracket 28 depending from the bottom of the deck. The lower end of each arm is pivoted on a transverse shaft 29. It is apparent that in the illustrated embodiment of the invention there are three swinging arms 27, one supporting each of the three decks. If desired, a pair of arms may be connected to each deck rather than a single arm. The result of this arrangement is that the receiving ends of the decks are vibrated through a circular path in a vertical plane as a result of the movement of the cranks 19, 20 and 21, with one of the decks always positioned opposite to the other two as is illustrated in Fig. 4. While the decks are thus being moved at the receiving end, the inner ends of all three decks are supported at approximately the same elevation by the upper ends of the swinging arms 27 and these inner ends of the decks merely rock back and forth in an arcuate path. The more violent movement imparted by the crank shaft is desirable at the receiving ends of the decks because a relatively rapid feed as far as the retarding drum, to be hereinafter described, is desired. After the bundles have been fed as far as the retarding drum the movement of the decks is not relied upon for further advancement of the corn stalks. Therefore, the support for the inner ends of the decks may be of any desired type, but the swinging arms 27 are preferred. Each of the decks 22, 23 and 24 is formed with upstanding side walls 30 having teeth 31 on their upper edges. These teeth aid in advancing the bundles as the decks are vibrating.

On each side of the vibratory decks are side walls 32, formed of sheet metal or any other suitable material, which form a trough for receiving and holding the bundles on top of the decks. In order not to hide other parts of the mechanism only portions of these trough forming walls are illustrated in Figs. 1 and 2.

Above the inner end portions of the decks the trough forming side wall portions 32 are formed with oval openings 33 which extend at an angle upwardly. Extending through said openings 33 is a shaft 34 on which a retarding drum 35 is rigidly mounted. The drum includes spaced end disks 36 and between the disks are a plurality of axially extending concave plates 37 which have abutting longitudinal edges forming gates. Projecting from each of the concave plates at approximately the longitudinal centerline thereof is a ledge 38.

The ends of the drum shaft 34 are journalled in openings formed in the upper ends of inclined supporting arms 39. These arms are positioned on opposite sides of the side plate 32, exteriorly thereof. The upper ends of the supporting arms are guided beneath straps 40 which permit movement of the supporting arms in the manner shown by the dot and dash lines in Fig. 2. The lower ends of the straps 40 are connected to the sides of the trough and form stops to limit downward movement of the arms 39. The lower or inner ends of the supporting arms 39 are formed with openings within which the ends of a beater shaft 41 rotatably extend. These ends of the beater shaft are also journalled through bearing blocks 42 which are slidable in slots 43 formed between spaced angle bars 44. A rod 45 projecting upwardly from each block 42 extends through a hole in an angle member 46 and is equipped with a coil spring 47. The upper end of the spring 47 bears against a collar 48. With this arrangement, the springs 47 constantly urge the bearing blocks 42 toward the raised position shown by full lines in Fig. 2. It is to be understood that the structure of the bearing block, rod, and spring is duplicated on the two sides of the trough. Rigidly mounted on the beater shaft 41 is a beater 49 (see Fig. 5).

Referring now more particularly to Fig. 3, the drive for the feeder and associated mechanism will be described. The transverse shaft 50 which is suitably driven from other portions of the machine and which serves to drive the combination snapping and husking rollers 12 in the manner shown in Fig. 2, is provided on one end with a sprocket wheel 51 which is connected by a sprocket chain 52 with a larger sprocket wheel 53 rigidly mounted on one end of a shaft 54. The opposite end of the shaft 54 carries a sprocket wheel 55 and a pulley 56. The pulley 56 is connected by a crossed endless belt 57 with a pulley 58 rigidly mounted on an end of the deck vibrating crank shaft 18. The sprocket wheel 55 on the transverse shaft 54 is connected by an endless chain 59 with a sprocket wheel 60 rigidly mounted on one end of the shaft 41 for the beater roll. The guideway slots 43 for the beater roll bearing blocks 42 extend at such an angle that there will be no substantial change in the tension of the endless chain 59 in any position of the beater shaft 41. Thus the floating mounting of the beater will not interfere with the drive. The opposite end of the shaft 41 has a rigidly mounted small sprocket wheel 61 which is connected by a chain 62 with a large sprocket wheel 63 rigidly mounted on an idler stud 64 projecting from one of the arms 39. The idler stud also carries a rigidly mounted small sprocket 65 which is connected by an endless chain 66 with a large sprocket wheel 67 rigidly mounted on an end of the shaft 34 for the retarding drum.

Due to the use of the connecting arms 39 which carry the drive sprockets 60, 61, 63, 65, and 67 the beater and drum can be driven from the same source without any difficulty because of the floating mountings.

In operation of the device, when a bundle of corn is thrown into the trough formed by the side plates 32 and onto the left hand or receiving ends of the decks 22, 23 and 24, referring to Figs. 1 and 2, the vibratory motion of the decks will cause the bundle to progress forwardly toward the drum 35 at a relatively fast rate. The driving arrangement is such that the crank shaft 18 is rotated at approximately 180 R. P. M., the drum 35 at approximately 9 R. P. M., the beater 49 at approximately 130 R. P. M., and the shaft 50 at approximately 300 R. P. M. These exact speeds are not critical but it is important that the rotation of the drum 35 be very slow. As the ends of the stalks hit one of the concave sections of the drum 35, such as the concave section (a), the forward movement of the bundle will be arrested. However, the relatively violent movement of the receiving ends of the vibrating decks, together with the action of the teeth 31 at the upper edges of the decks, will tend to separate the individual stalks in the bundle and cut the bands of twine. It is immaterial how many bundles are thrown one on top of another in the trough above the vibrating decks as long as each bundle is spaced somewhat rearwardly of the bundle therebelow. The concave section (b) will tend to push and hold back the bundle next above the lowermost bundle as the lowermost bundle is being moved slowly beneath the drum. As the stalks of the lowermost bundle move beneath the drum the upper ends of the arms 39 will yield upwardly within the straps 40 from the position of Fig. 2 to the position of Fig. 5 to allow more space between the drum 35 and the inner ends of the decks. This movement will be against the weight of the drum 35. Due to the interconnection between the drum and the beater 49 through the use of the arms 39, when the drum is raised the weight of the drum will tend to cause the beater shaft and beater to be lowered, against the tension of the springs 47, from the full line position of Fig. 2 to the dot and dash line position therein. However, under certain conditions the beater may also be elevated. The arrangement of the floating mountings is such that both the drum and beater can adapt themselves to requirements. The position of the beater with respect to the inner ends of the decks and with respect to the snapping rolls together with the inclined ends 68 of the decks will cause a bending of the stalks to cause the latter to "turn the corner" and be properly directed through the snapping portions 13 of the combination snapping and husking rollers as is clear from Fig. 5.

The beater also tends to spread the stalks and acts as an agitator to prevent broken stalks from lodging in a crosswise position instead of being fed through the rollers.

It is thus apparent that by having the particular relationship between the vibratory decks, slow speed retarding drum, and beater, that it is practical to employ a self feeder in a corn husker of the type illustrated wherein there are combination snapping and husking rolls. The drive for the vibrating decks is such that the receiving ends of the decks have a relatively violent vibration through a circular path in a vertical plane to cause relatively rapid advancement of bundles as far as the retarding drum 35. From this point on the movement of the decks is relatively unimportant, as far as the advancement of the stalks is concerned, because the movement and guiding of the stalks is then taken care of by the revolving drum and the beater. The opposing forces of the relatively rapid motion of the receiving ends of the vibrating decks as against the relatively slow speed of the revolving drum 35 causes an effective separating action of the bundle. This action, in conjunction with the teeth on the upper edges of the decks, causes a breaking and cutting of the twine on the bundles.

While the use of the connecting arms 39 is desirable, particularly in simplifying the driving connections, nevertheless these connections may be omitted as long as the drum and beater are permitted to float and are arranged as illustrated.

Various changes and modifications may be made without departing from the spirit of the invention and all of such changes are contemplated as may come within the scope of the claims.

What I claim is:

1. In a corn husking machine having snapping rolls which extend in a generally longitudinal direction on the machine, a plurality of juxtaposed vibratory decks extending longitudinally of the machine and having inner ends disposed above the snapping rolls, a transversely extending retarding drum rotatably mounted above the decks near the inner ends thereof, a transversely extending beater rotatably mounted beyond the inner ends of the decks and above the snapping rolls, said beater being so positioned with respect to the inner ends of the decks and with respect to the snapping rolls as to direct the stalks at an angle downwardly with respect to their direction of movement on the decks into the bite of the snapping rolls, means providing for movement of said retarding drum toward and away from the decks depending upon the amount of material passing below said drum, means providing for movement of said beater toward and away from said snapping rolls, a connection including rigid arms between said retarding drum and beater whereby movement of the retarding drum toward or away from the decks is accompanied by movement of the beater, means for driving said beater, and speed reducing mechanism carried by said connection between the retarding drum and beater for transmitting rotation from said beater to said retarding drum to drive the latter at a speed substantially lower than the speed of rotation of the beater.

2. In a corn husking machine having snapping rolls which extend in a generally longitudinal direction on the machine, a plurality of juxtaposed vibratory decks extending longitudinally of the machine and having inner ends toward which material is adapted to be fed disposed above the snapping rolls, a transversely extending retarding drum rotatably mounted above the decks near the inner ends thereof, a transversely extending beater rotatably mounted beyond the inner ends of the decks and above the snapping rolls, said beater being so positioned with respect to the inner ends of the decks and with respect to the snapping rolls as to direct the stalks at an angle downwardly with respect to their direction of movement on the decks into the bite of the snapping rolls, means providing for movement of said beater toward and away from said snapping rolls, rigid arms having swingable connection at their inner ends with said beater shaft, said retarding drum being rotatably supported by the opposite ends of said arms and said opposite ends being swingable around the axis of said retarding drum, and means for rotating said retarding drum continuously in a feeding direction at a relatively low speed substantially less than the speed of said beater.

3. In a corn husking machine having snapping rolls which extend in a generally longitudinal direction on the machine, a plurality of juxtaposed vibratory decks extending longitudinally of the machine and having inner ends toward which material is adapted to be fed disposed above the snapping rolls, a transversely extending retarding drum rotatably mounted above the decks near the inner ends thereof, a transversely extending beater rotatably mounted beyond the inner ends of the decks and above the snapping rolls, said beater being so positioned with respect to the inner ends of the decks and with respect to the snapping rolls as to direct the stalks at an angle downwardly with respect to their direction of movement on the decks into the bite of the snapping rolls, bearing blocks through which the ends of the beater shaft are journalled, guides for said bearing blocks providing for movement of the beater toward and away from the snapping rolls, arms swingably connected at their inner ends to said beater shaft, the retarding drum being rotatably supported by the outer ends of said arms and the arms being swingable around the axis of said retarding drum, and means for rotating said retarding drum continuously in a feeding direction at a relatively low speed substantially less than the speed of rotation of said beater.

4. In a corn husking machine having snapping rolls which extend in a generally longitudinal direction on the machine, a plurality of juxtaposed vibratory decks extending longitudinally of the machine and having inner ends toward which material is adapted to be fed disposed above the snapping rolls, a transversely extending retarding drum rotatably mounted above the decks near the inner ends thereof, a transversely extending beater rotatably mounted beyond the inner ends of the decks and above the snapping rolls, said beater being so positioned with respect to the inner ends of the decks and with respect to the snapping rolls as to direct the stalks at an angle downwardly with respect to their direction of movement on the decks into the bite of the snapping rolls, bearing blocks through which the ends of the beater shaft are journalled, guides for said bearing blocks providing for movement of the beater toward and away from the snapping rolls, yielding means normally urging the beater bearing blocks in a direction away from the snapping rolls, arms swingably connected at their inner ends to said beater shaft, the retarding drum being rotatably supported by the outer ends of said arms and the arms being swingable around the axis of said retarding drum, and means for rotating said retarding drum continuously in a feeding direction at a relatively low speed substantially less than the speed of rotation of said beater.

5. In a corn husking machine having snapping rolls which extend in a generally longitudinal direction on the machine, a plurality of juxtaposed vibratory decks extending longitudinally of the machine and having inner ends disposed above the snapping rolls, a transversely extending retarding drum rotatably mounted above the decks near the inner ends thereof, a shaft for said retarding drum, a transversely extending beater rotatably mounted beyond the inner ends of the decks above the snapping rolls, a shaft for said beater, said beater being so positioned with respect to the inner ends of the decks and with respect to the snapping rolls as to direct the stalks at an angle downwardly with respect to their direction of movement on the decks into the bite of the snapping rolls, bearing blocks through which the ends of the beater shaft are journalled, guides for said bearing blocks providing for movement of the beater toward and away from the snapping rolls, rigid arms having inner ends swingably connected to the beater shaft, said retarding drum being rotatably supported by the outer ends of said arms and said arms being swingable around the axis of said retarding drum, means for driving said beater, a small sprocket wheel rigidly connected to one end of the beater shaft, a stud journalled intermediate the length of the connecting arm which is on the same side of the machine as said sprocket wheel, large and small sprocket wheels rigidly mounted on said stud, a large sprocket wheel on said retarding drum shaft, an endless chain connecting the beater shaft sprocket wheel with the large sprocket wheel on said stud, and an endless chain connecting the retarding drum shaft sprocket wheel with the small sprocket wheel on said stud.

HENRY L. ROSENTHAL.

REFERENCES CITED

The following references are of record in the file of this patent:

UNITED STATES PATENTS

| Number | Name | Date |
|---|---|---|
| 721,137 | Bate | Feb. 24, 1903 |
| 1,078,697 | Rosenthal | Nov. 18, 1913 |
| 1,142,844 | Rosenthal | June 15, 1915 |
| 2,112,918 | MacDonald | Apr. 5, 1938 |
| 2,235,918 | Dion | Mar. 25, 1941 |
| 2,317,822 | Stelter | Apr. 27, 1943 |